United States Patent [19]

Munroe

[11] Patent Number: 4,765,373

[45] Date of Patent: Aug. 23, 1988

[54] GAS FLOW AMPLIFIER

[75] Inventor: Richard W. Munroe, Millbury, Mass.

[73] Assignee: Coppus Engineering Corporation, Worcester, Mass.

[21] Appl. No.: 70,490

[22] Filed: Jul. 7, 1987

[51] Int. Cl.[4] .............................................. F16K 19/00

[52] U.S. Cl. .................................... 137/890; 137/888; 417/197

[58] Field of Search ................ 417/197; 137/888, 890, 137/891

[56] References Cited

U.S. PATENT DOCUMENTS

| | | | |
|---|---|---|---|
| 2,444,615 | 7/1948 | Reinhardt | 417/197 X |
| 3,099,965 | 8/1963 | Regenscheit | 417/197 |
| 3,720,482 | 3/1973 | Tell | 417/197 X |
| 3,799,195 | 3/1974 | Hermans | 137/891 X |

FOREIGN PATENT DOCUMENTS

| | | | |
|---|---|---|---|
| 229100 | 12/1984 | Japan | 417/197 |

*Primary Examiner*—Robert G. Nilson
*Attorney, Agent, or Firm*—Samuels, Gauthier, Stevens & Kehoe

[57] ABSTRACT

A gas flow amplifier has a housing defining an axially extending cylindrical chamber. A hollow truncated conical diffuser diverges outwardly from one end of the chamber, and a high pressure primary gas is introduced into the chamber at its opposite end in a manner such as to entrain a flow of ambient secondary gas into the chamber, and to cause the thus introduced primary gas and entrained secondary gas to exit from the chamber and into and through the diffuser.

9 Claims, 3 Drawing Sheets

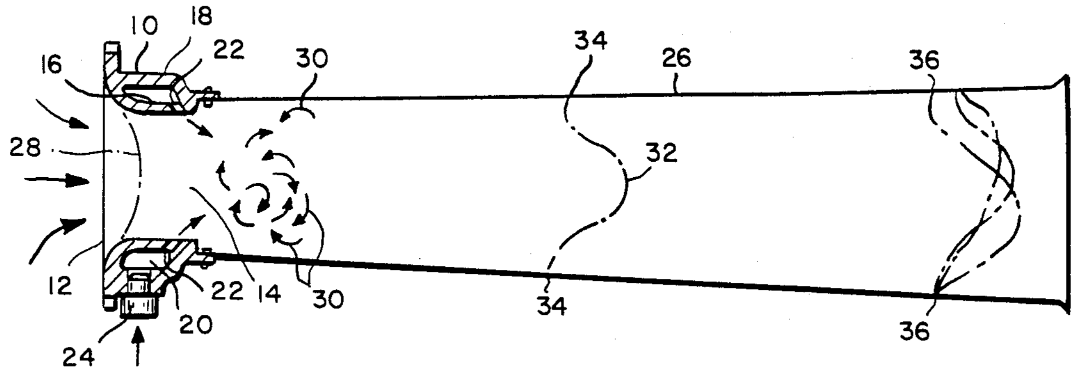
FIG. 1 PRIOR ART
FIG. 3
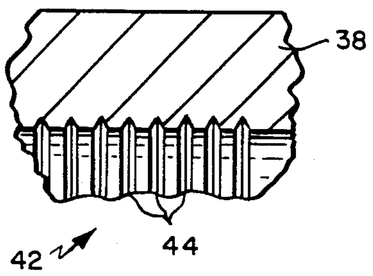
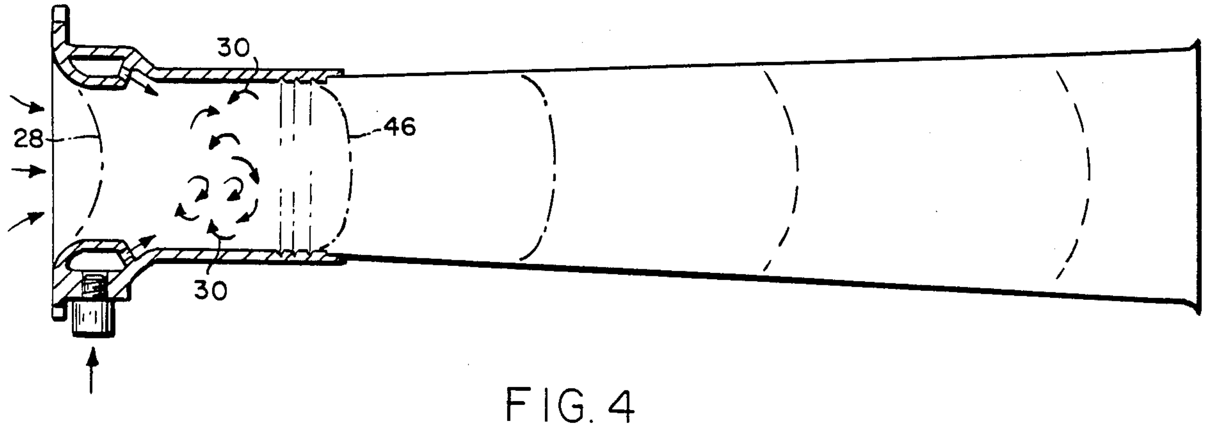
FIG. 4

GAS FLOW AMPLIFIER

BACKGROUND OF THE INVENTION

1. Field of the Invention

This invention relates to gas flow amplifiers of the type which employ a high pressure, relatively low volume primary gas flow to induce additional secondary gas flow at a net lower pressure.

2. Description of the Prior Art

In the typical prior art gas flow amplifier, as illustrated for example in FIG. 1, a housing 10 has an inlet port 12, an outlet port 14, and inner and outer wall portions 16,18 defining a manifold chamber 20. Nozzle openings 22 are drilled into the inner wall 16 at circumferentially spaced locations surrounding the outlet port 14, and an inlet fitting 24 is provided in the outer wall 18. A hollow truncated conical diffuser 26 is attached to the housing 10 in communication with the outlet port 14.

A relatively high pressure and low volume primary gas such as for example compressed air or steam is fed into the chamber 20 via inlet fitting 24. The primary gas exits chamber 20 via the nozzle openings 22 and is injected in a converging pattern into the small diameter end of the diffuser 26. The thus injected primary gas entrains a flow of ambient secondary gas into the diffuser via the inlet port 12.

The arrows in FIG. 1 schematically depict the directions of gas flow, and the broken lines illustrate velocity profiles. It will be seen that the entrained ambient secondary gas enters the housing 10 with an essentially laminar velocity flow profile 28. However, at the inlet end of the diffuser, the secondary gas mixes with the injected primary gas with accompanying extreme turbulence, and with immediate separation of flow as at 30 due to premature expansion in the diverging diffuser. As the combined flow of primary and secondary gases continues along the diffuser, a laminar flow pattern 32 begins to re-establish itself, but separation continues as at 34. The combined gas flow ultimately exits from the enlarged end of the diffuser with a somewhat unstable laminar flow pattern, and with some intermittent separation still in evidence as indicated for example at 36.

SUMMARY OF THE INVENTION

It has been theorized that the efficiency of the gas flow amplifier (measured as the ratio of injected primary gas to total combined gas flow) is compromised rather significantly by the energy losses resulting from the very early occurrence of separation in the diffuser as at 30 followed by continued separation at 34 and 36 as the combined gas flow travels the remaining length of the diffuser.

A primary objective of the present invention is, therefore, to improve efficiency by eliminating or at least substantially minimizing and delaying the occurrence of gas flow separation along the length of the diffuser wall.

A companion objective of the present invention is to achieve the above-noted improvement in efficiency with minimal yet strategically disposed structural modifications to the conventional gas flow amplifier illustrated in FIG. 1.

In a preferred embodiment of the invention to be described hereinafter in greater detail, these and other objects and advantages are achieved by introducing a cylindrical mixing chamber between the primary gas injection nozzles and the entry end of the diverging diffuser. The axial length of the mixing chamber is sufficient to accommodate a substantial homogenization of the turbulence accompanying mixture of the primary and secondary gases. Thus, the combined gas flow entering the diffuser is characterized by a somewhat flattened mean velocity profile with higher energy content at the boundary layer adjacent to the diffuser wall. This substantially inhibits separation at the boundary layer and thereby significantly increases efficiency.

Preferably, in order to further improve efficiency, the wall of the cylindrical mixing chamber is intentionally roughened adjacent to the entry end of the diffuser. This roughening enhances localized turbulence at the boundary layer, with an accompanying further increase in energy available to counteract separation.

BRIEF DESCRIPTION OF THE DRAWINGS

FIG. 1 is a vertical sectional view taken through a conventinal prior art flow amplifier;

FIG. 3 is a greatly enlarged partial sectional view of the roughened wall portion of the cylindrical mixing chamber;

FIG. 4 is an illustration of the gas flow amplifier of FIG. 2 diagrammatically depicting directions of gas flow and velocity profiles.

DETAILED DESCRIPTION OF PREFERRED EMBODIMENT

Figure 2:
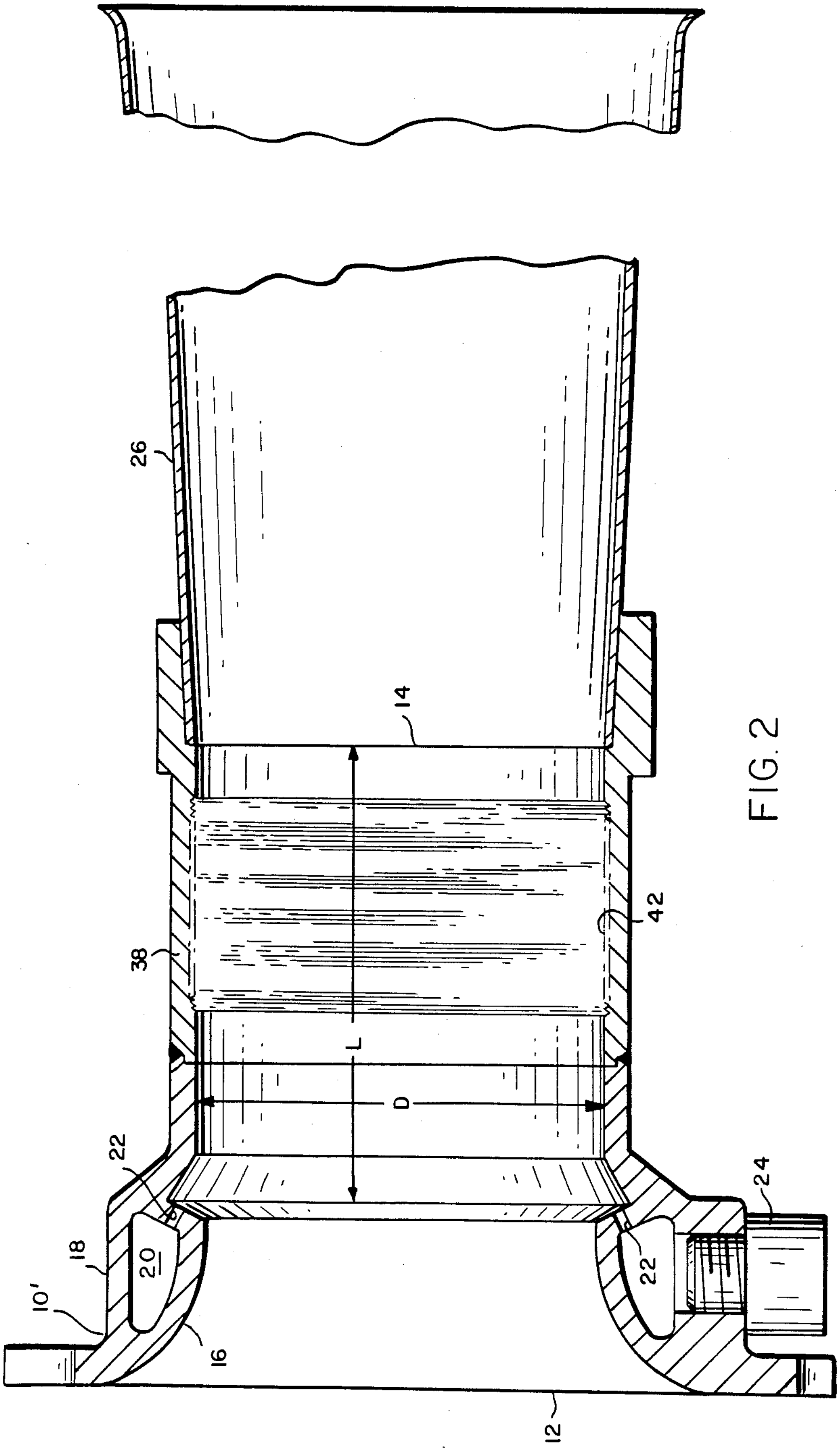
FIG. 2 is an enlarged foreshortened vertical sectional view taken through a gas flow amplifier in accordance with the present invention.

With reference to FIG. 2, a preferred embodiment of a gas flow amplifier is disclosed, with those features which are common to the prior art gas flow amplifier of FIG. 1 being identified by the same reference numerals. It will be seen that the housing 10' has been modified to include an axially extending cylindrical wall 38 defining a mixing chamber 40. The length "L" of the chamber between the nozzle openings 22 and the outlet port 14 is sufficient to accommodate substantial homogenization of the turbulence accompanying mixture of the primary and secondary gases. This substantial homogenization occurs prior to entry of the combined gas flow into the diffuser 26. Preferably, the length L of chamber 40 is at least about 0.5 times the internal diameter "D" of the chamber measured at a location downstream of the nozzle openings 22, and is not more than 1.5 times D for modest back pressures on the order of up to about 6" W.G. For higher back pressures, it may be advantageous to increase the length of the chamber to as much as 2 to 3 times D.

The exit end of the cylindrical wall 38 adjacent to the entry end of the diffuser 26 is preferably roughened as at 42 to enhance the creation of localized turbulence in the boundary layer of the combined flow of gases existing from the chamber 40. The roughened wall section preferably has a RMS micro inch roughness value of between about 250–1500. This roughness can be achieved by various means. Most preferably, however, as can be best seen in FIG. 3, roughness is achieved by interrupting the wall surface with a series of axially spaced serrations 44.

Referring now to FIG. 4, it will be seen that as with the prior are device, incoming secondary gas flow will exhibit a substantially laminar velocity profile 28. The primary and secondary gases will again undergo extremely turbulent mixing with attendant separation at the boundary layer as at 30. However, the length L of the chamber 40 is sufficient to accommodate substantial homogenization of this turbulence prior to entry of the combined flow of gases into the diffuser. Thus, the combined flow of gases entering the diffuser is characterized by a unidirectional flow profile 46 with embedded substantially homogeneous turbulence. Localized turbulence is enhanced at the boundary layer as a result of the roughened exit wall segment 42 of the chamber.

By elevating the level of energy at the boundary layer of the combined gas flow entering the diffuser 26, separation is substantially delayed, thereby significantly increasing overall efficiency.

Figure 5:
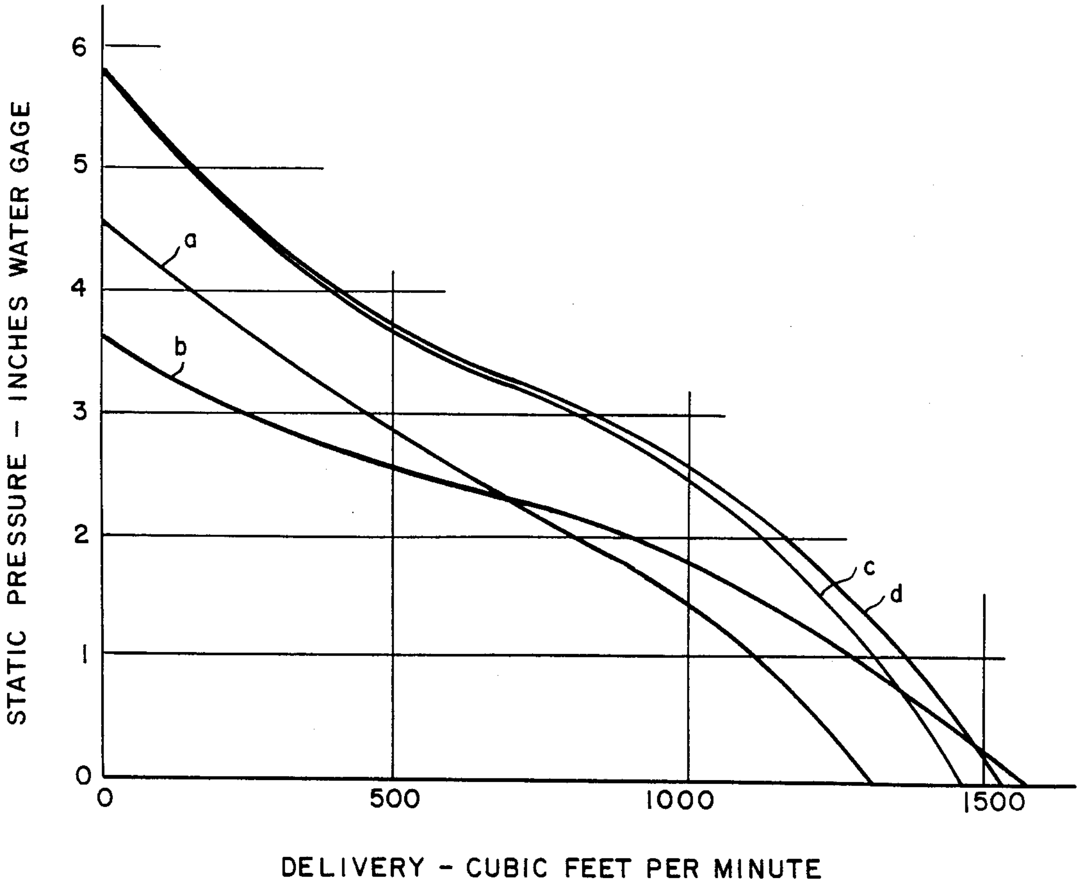
FIG. 5 is a graph comparing the performance of a flow amplifier of the present invention with that of the prior art flow amplifier.

The graph of FIG. 5 is illustrative of the benefits to be derived from the present invention. All curves represent operation with compressed air at 60 p.s.i. Curve "a" depicts the performance of a conventional unit of the type shown in FIG. 1, with an inner diameter of 3.63" measured directly adjacent to the entry end of the diffuser 26.

Curve "b" depicts the change in performance made possible by increasing the internal diameter to an optimum measurement of 3.88". Note that performance is improved when operating below back pressures of about 2.4" W.G. However, at higher back pressures, performance is impaired.

Curve "c" illustrates the benefits of retaining the optimum internal diameter of 3.88" in combination with the introduction of a cylindrical mixing chamber having a length of 3.75" in advance of the diffuser, as shown in FIGS. 2 and 4. As compared with curve a, curve c shows an across the board significant improvement. The same is true with respect to curve b except at back pressures below about 0.9" W.G., where some loss of delivery capacity is experienced.

Curve "d" illustrates the additional benefits to be derived from roughening the wall of the mixing chamber as shown at 42 in FIG. 2. As compared with curve c, improved performance is achieved at back pressures below about 3" W.G., with the aforesaid loss of delivery capacity at back pressures below about 0.9" W.G. being almost completely regained. It will thus be seen that the present invention offers significant improvements in performance over conventional designs of the type illustrated in FIG. 1.

In light of the foregoing, it will now be appreciated by those skilled in the art that modifications may be made to the preferred embodiment disclosed in FIGS. 2–4 without departing from the scope of the invention as defined by the claims hereinafter set forth. For example, the invention may be employed with flow amplifiers having different means for injecting the high pressure primary gas, including for example a circumferential slot surrounding the flow axis, or an injector element suspended in the miximg chamber. Other means may be employed to roughen the chamber wall, including for example dimpling, cross hatching, etc.

I claim:

1. A gas flow amplifier comprising:

a housing defining an axially extending cylindrical chamber, said housing having inlet and outlet ports communicating respectively with opposite ends of said chamber;

a hollow truncated conical diffuser diverging outwardly from a smaller end to a larger end;

means for connecting the smaller end of said diffuser to said chamber at said outlet port;

injection means arranged between said inlet and outlet ports for introducing a flow of pressurized primary gas into said chamber in a manner such as to entrain a flow of ambient secondary gas into said chamber via said inlet port, and to cause the thus introduced primary gas and entrained secondary gas to exit from said chamber as a combined flow via said outlet port and through said diffuser and means for enhancing localized turbulence in the boundary layer of the combined flow of gases exiting from said chamber.

2. The gas flow amplifier of claim 1 wherein said primary and secondary gases experience interim turbulence while being mixed in said chamber, and wherein the length of said chamber from injection means to said outlet port is sufficient to accommodate substantial homogenization of said turbulence prior to entry of the combined flow of gases into said diffuser.

3. The gas flow amplifier of either claims 1 or 2 wherein the length of said chamber from said injection means to said outlet port is at least about 0.5 D where "D" equals the internal diameter of the chamber downstream of the injection means.

4. The gas flow amplifier of either claims 1 or 2 wherein the length of said chamber from said injection means to said outlet port is between about 0.5 to 1.5 D where "D" equals the internal diameter of the chamber downstream of the injection means.

5. The gas flow amplifier of claim 1 wherein said primary and secondary gases experience interim turbulence while being mixed in said chamber, wherein the entrained flow of seconary gas entering said chamber is essentially laminar, and wherein the combined flow of gases exiting said chamber has a unidirectional flow profile with embedded substantially homogeneous turbulence.

6. The gas flow amplifier of claim 1 wherein said means for enhancing localized turbulence comprises a roughened wall segment of said chamber directly adjacent to said outlet port.

7. The gas flow amplifier of claim 6 wherein said roughened wall segment has a RMS micro inch roughness value of between about 250–1500.

8. The gas flow amplifier of claim 1 wherein said means for enhancing localized turbulence comprises a plurality of axially spaced serrations in the wall of said chamber at a location spaced axially from said injection means and directly adjacent to said outlet port.

9. A gas flow amplifier comprising:

a housing defining a cylindrical mixing chamber, said housing having inlet and outlet ports communicating respectively with said mixing chamber at the opposite ends thereof, said inlet and outlet ports being aligned coaxially with and axially separated by said mixing chamber;

a hollow truncated conical diffuser connected at one end to said housing at said outlet port and diverging outwardly therefrom;

injection means for introducing a pressurized flow of a primary gas into said mixing chamber in a manner such as to entrain a flow of ambient secondary gas into said mixing chamber via said inlet port, with said primary and secondary gases experiencing interim turbulence while being mixed in said chamber, the length of said chamber from said injection means to said outlet port being sufficient to substantially homogenize said turbulence prior to entry of the combined flow of said primary and secondary gases into said diffuser; and means for creating localized turbulence in the boundary layer of the combined flow of primary and secondary gases exiting from said chamber.

* * * * *